US012812444B2

(12) United States Patent
Youtz et al.

(10) Patent No.: US 12,812,444 B2
(45) Date of Patent: Nov. 24, 2026

(54) SYSTEMS AND METHODS FOR DYNAMIC BACK-OFF TIMER IN A WIRELESS NETWORK

(71) Applicant: Verizon Patent and Licensing Inc., Basking Ridge, NJ (US)

(72) Inventors: Andrew E. Youtz, Princeton, NJ (US); Chintankumar Patel, Edison, NJ (US); Tate Morgan Schmitz, Fort Myers, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 265 days.

(21) Appl. No.: 18/660,769

(22) Filed: May 10, 2024

(65) Prior Publication Data

US 2025/0350992 A1 Nov. 13, 2025

(51) Int. Cl.

*H04W 28/02* (2009.01)
*H04W 74/0833* (2024.01)
*H04W 76/18* (2018.01)

(52) U.S. Cl.

CPC ... *H04W 28/0236* (2013.01); *H04W 74/0833* (2013.01); *H04W 76/18* (2018.02)

(58) Field of Classification Search

CPC ......... H04W 28/0236; H04W 74/0833; H04W 76/18; H04L 47/74; H04L 36/00

See application file for complete search history.

(56) References Cited

U.S. PATENT DOCUMENTS 10,171,682 B1 * 1/2019 Yan ........................ H04W 12/72
10,306,694 B2 * 5/2019 Wager ................... H04W 76/18
10,939,476 B1 * 3/2021 Chu ...................... H04W 76/15
12,048,008 B2 * 7/2024 Turtinen ........... H04W 74/0841
2002/0163929 A1 * 11/2002 Li ......................... H04L 12/413 370/448
2005/0096053 A1 * 5/2005 Liu ...................... H04B 17/382 455/439
2011/0034199 A1 * 2/2011 Zhao ....................... H04L 69/28 455/510

(Continued)

FOREIGN PATENT DOCUMENTS

WO WO-2015002087 A1 * 1/2015 ............ H04W 72/52
WO WO-2017137060 A1 * 8/2017 ............... H04L 1/08

(Continued)

*Primary Examiner* — Aaron N Strange

(57) ABSTRACT

A device, such as a User Equipment ("UE"), may maintain a set of criteria associated with back-off timer policies. The device may determine that an attempt to communicate with the network is unsuccessful, and may initiate a back-off timer based on determining that the attempt to communicate with the network is unsuccessful. The device may refrain from attempting to communicate with the network after initiating the back-off timer and prior to expiration of the back-off timer. The device may determine, after initiating the back-off timer and prior to expiration of the back-off timer, that criteria of the set of criteria associated with a back-off timer policy have been met, and may modify a duration of the back-off timer based on determining that the one or more criteria have been met. The device may accordingly attempt to communicate with the network after the back-off timer with the modified duration has elapsed.

20 Claims, 10 Drawing Sheets

(56) References Cited

U.S. PATENT DOCUMENTS

| | | | | |
|---|---|---|---|---|
| 2013/0265866 | A1* | 10/2013 | Yi | H04W 28/04 370/216 |
| 2014/0286203 | A1* | 9/2014 | Jindal | H04W 16/14 370/278 |
| 2015/0045021 | A1* | 2/2015 | Schlatter | H04W 36/322 455/434 |
| 2015/0181639 | A1* | 6/2015 | Liu | H04W 76/18 370/329 |
| 2017/0118725 | A1* | 4/2017 | Chu | H04W 52/325 |
| 2022/0015119 | A1* | 1/2022 | He | H04W 72/1268 |
| 2022/0417814 | A1* | 12/2022 | Bhowmik | H04W 36/0079 |
| 2023/0422196 | A1* | 12/2023 | Youtz | H04W 60/00 |
| 2025/0380326 | A1* | 12/2025 | Yau | H04L 65/1016 |

FOREIGN PATENT DOCUMENTS

| | | | | |
|---|---|---|---|---|
| WO | WO-2019145876 | A1 * | 8/2019 | H04W 74/0838 |
| WO | WO-2019245779 | A1 * | 12/2019 | H04W 72/23 |
| WO | WO-2022014868 | A1 * | 1/2022 | H04W 24/10 |
| WO | WO-2023011871 | A1 * | 2/2023 | H04L 43/065 |

* cited by examiner

SYSTEMS AND METHODS FOR DYNAMIC BACK-OFF TIMER IN A WIRELESS NETWORK

BACKGROUND

Wireless networks provide wireless connectivity to User Equipment ("UEs"), such as mobile telephones, tablets, Internet of Things ("IoT") devices, Machine-to-Machine ("M2M") devices, or the like. In situations where UEs are unable to obtain wireless connectivity from a wireless network, such as when the UE is out of range of a base station of a wireless network, when excessive wireless interference prevents the UE from communicating with the wireless network, etc., UEs may attempt or reattempt to communicate with the wireless network. Wireless networks may implement mechanisms to prevent excessive retry attempts in order to protect from overloading of network resources. Some wireless networks may implement back-off timers, which specify an amount of time that a UE should wait after a particular quantity of unsuccessful attempts to communicate with the wireless network before retrying to communicate with the wireless network. For example, if a UE is unsuccessful in connecting to a wireless network after five attempts, a back-off timer may be initiated by the UE (e.g., 10 minutes, 12 minutes, 15 minutes, or some other duration of time) during which the UE will not attempt to connect to the wireless network, and after which the UE may once again attempt to connect to the wireless network.

DETAILED DESCRIPTION OF EXAMPLE EMBODIMENTS

The following detailed description refers to the accompanying drawings. The same reference numbers in different drawings may identify the same or similar elements.

Embodiments described herein provide for a dynamic back-off timer in wireless networks. As noted above, a back-off timer may be used by a UE after the UE unsuccessfully attempts to connect to a wireless network. During the duration of the back-off timer, the UE may forgo attempting to connect to the wireless network, and after the back-off timer elapses, the UE may again attempt to connect to the wireless network. The use of the back-off timer may prevent excessive attempts by the UE to connect to the wireless network in situations where it is unlikely that repeated attempts will result in a successful connection between the UE and the wireless network, thus conserving network resources as well as UE battery life. However, some scenarios may occur where, while the back-off timer is running, factors that led to the unsuccessful attempts to connect to the network have changed (e.g., are no longer present). Embodiments described herein provide for the modification (e.g., shortening and/or stopping) of such back-off timer in situations where such factors have changed, thus allowing for the UE to potentially gain connectivity to the wireless network faster than waiting for the back-off timer to elapse.

Figure 1:
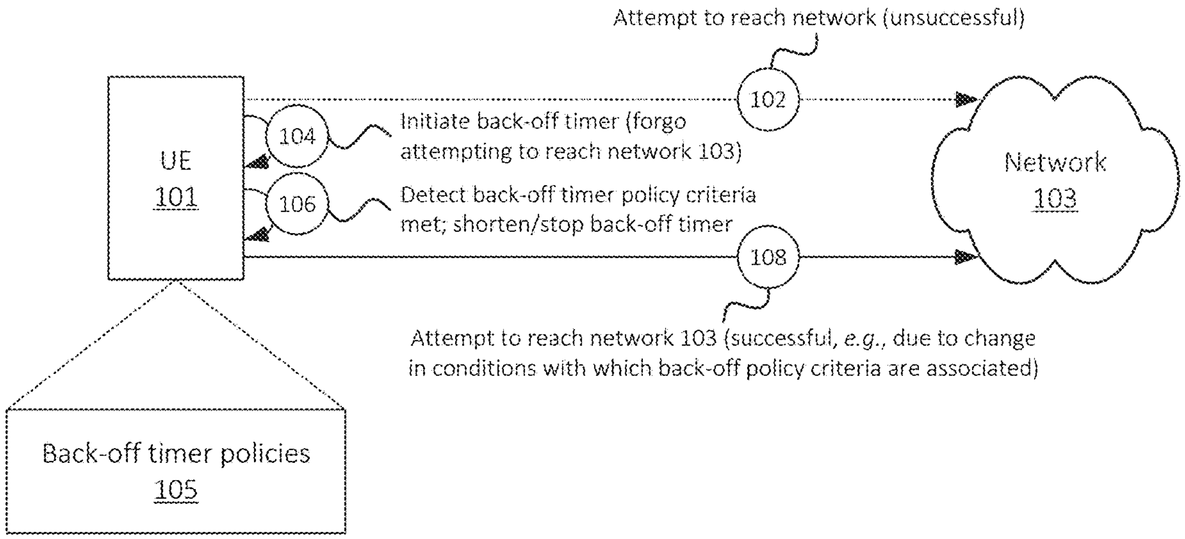
FIG. 1 illustrates an example overview of one or more embodiments described herein.

As shown in FIG. 1, for example, a particular UE 101 may unsuccessfully attempt (at 102) to reach a particular network 103. As discussed below, attempting to reach network 103 may include attempting to connect to a base station of a RAN that is included in or is associated with network 103 (e.g., requesting to attach to the base station, requesting the establishment of a Random Access Channel ("RACH"), etc.), attempting to establish a protocol data unit ("PDU") session with a core network included in or associated with network 103, and/or some other suitable type of communication attempt or request. In some embodiments, attempting (at 102) to reach network 103 may include outputting multiple messages, requests, etc. to network 103.

UE 101 may be unsuccessful in reaching network 103 due to various factors, such as wireless interference, congestion of network 103, distance from wireless network infrastructure equipment of network 103 (e.g., one or more base stations of a RAN of network 103), physical obstacles between UE 101 and wireless network infrastructure equipment of network 103, weather conditions, location of UE 101 within a building or structure (e.g., a basement or lower floor of a building), or other factors.

After unsuccessfully attempting (at 102) to reach network 103, UE 101 may initiate (at 104) a back-off timer, during which UE 101 forgoes attempting to reach network 103. In some embodiments, UE 101 may initiate the back-off timer after a particular quantity of attempts to reach network 103 (e.g., a particular quantity of messages or requests sent to network 103 for which network 103 does not provide a response or otherwise does not accept the requests). In some embodiments, the back-off timer may be a predetermined duration, during which UE 101 does not attempt to reach network 103. In some embodiments, the duration of the back-off timer may vary based on one or more factors, including the type of connection attempt that was unsuccessful (e.g., a RAN attachment request, a RACH request, a PDU session establishment request, etc.).

In accordance with some embodiments, UE 101 may also maintain a set of back-off timer policies 105. For example, UE 101 may receive back-off timer policies 105 from a provisioning or management system associated with network 103, may receive back-off timer policies 105 as part of an Over-the-Air ("OTA") update procedure, may receive back-off timer policies 105 via an application programming interface ("API"), or may otherwise receive or maintain back-off timer policies 105. In some embodiments, different UEs 101 may receive or maintain different respective sets of back-off timer policies 105. Back-off timer policies 105 may specify criteria based on which the back-off timer should be modified (e.g., shortened or stopped while such back-off timer is running). Generally, for example, back-off timer policies 105 may account for situations in which one or more factors that caused UE 101 to be unsuccessful in reaching network 103 have changed. For example, back-off timer policies 105 may account for situations in which UE 101 may have moved closer to wireless network infrastructure equipment of network 103, wireless interference affecting wireless signals between UE 101 and wireless network infrastructure equipment of network 103 may have subsided, congestion of network 103 may have subsided, UE 101 may have moved within a building (e.g., from a lower floor to an upper floor), and/or other events or conditions that may potentially be associated with an increased likelihood of successfully connecting to network 103.

In some embodiments, criteria for a given UE 101 may include location-based criteria, such as a location or area in which UE 101 is located (or is predicted to be located by AI/ML techniques or other predictive techniques). In some embodiments, the criteria may include altitude or story-based criteria, such as altitude of UE 101 above sea level, height of UE 101 above ground level, a particular floor or story of a building, etc. In some embodiments, the criteria may include movement-based criteria, such as a distance that UE 101 moves over a particular period of time, a movement of UE 101 from one serving cell of network 103 to another serving cell of network 103, a movement of UE 101 from one floor of a building to another, etc.

In some embodiments, the criteria may be based on wireless signal strength or quality metrics associated with wireless signals sent to and/or from UE 101 and/or network 103, such as Signal-to-Interference-and-Noise-Ratio ("SINR"), Reference Signal Received Power ("RSRP"), Reference Signal Received Quality ("RSRQ"), Received Signal Strength Indicator ("RSSI"), etc. In some embodiments, the criteria may be based on commands or instructions provided by network 103 to UE 101, such as "back-off" instructions (e.g., an instruction to initiate or modify a back-off timer), congestion indications (e.g., an indication that network 103 is congested), and/or other types of messages sent from network 103 to UE 101. In some embodiments, the criteria may be based on wireless signal or quality metrics between UE 101 and a network other than network 103, such as a wireless local area network ("WLAN"), a WiFi network, a private network, etc.

In some embodiments, back-off timer policies 105 may further include parameters specifying how to modify a back-off timer when one or more of the criteria are met. Back-off timer policies 105 may specify one type of timer modification for one criterion, and another type of timer modification for another criterion. For example, back-off timer policies 105 may specify (e.g., based on location-based criteria) that if UE 101 moves from a first location or area (e.g., a coverage area of a first base station, a first tracking area ("TA"), a first cell, etc.) to a second location or area (e.g., a coverage area of a second base station, a second TA, a second cell, etc.), that an active back-off timer should be stopped (e.g., such that UE 101 is permitted to attempt to connect to network 103 via the second base station once the back-off timer is stopped). On the other hand, back-off timer policies 105 may specify that if signal quality metrics between UE 101 and network 103 improve or exceed one or more thresholds, that the back-off timer should be shortened or sped up (e.g., a remaining duration of the timer should be cut in half or otherwise reduced). In some embodiments, the modification to the back-off timer may be specified as any suitable function, operation, etc. For example, the modification to a given back-off timer may be specified as a function of time remaining on the back-off timer (e.g., if relatively more time is remaining, the modification may include reducing the back-off timer by a first amount, while if relatively less time is remaining, the modification may include reducing the back-off timer by a second amount). In this manner, different criteria, conditions, parameters, etc. may be associated with different modifications to a back-off timer implemented by UE 101.

In some embodiments, back-off timer policies 105 may be generated or determined by an administrator or operator of network 103. In some embodiments, back-off timer policies 105 may be generated, refined, updated, etc. using automated techniques, such as artificial intelligence/machine learning ("AI/ML") techniques.

At some point during the back-off timer's duration (e.g., within 10 minutes of starting the back-off timer if the back-off timer's duration is 10 minutes; within 12 minutes of starting the back-off timer if the back-off timer's duration is 12 minutes; etc.), UE 101 may detect (at 106) that one or more criteria specified by back-off timer policies 105 have been met. For example, UE 101 may detect that a location of UE 101 is within a location or area specified by back-off timer policies 105, that UE 101 has moved from a lower floor of a building to a higher floor of the building, that signal strength or quality metrics associated with wireless signals between UE 101 and network 103 (e.g., Signal-to-Interference-and-Noise-Ratio ("SINR"), Reference Signal Received Power ("RSRP"), etc.) have improved or exceed one or more thresholds, that a measure of congestion with respect to network 103 has decreased or is below one or more thresholds, that UE 101 has moved into a coverage area associated with a particular base station or cell of network 103, and/or that one or more other criteria specified by back-off timer policies 105 have been met.

Based on detecting that one or more particular criteria specified by back-off timer policies 105 have been met, UE 101 may modify the back-off timer (initiated at 104). For example, UE 101 may stop the back-off timer, may pause the back-off timer, may shorten the back-off timer, may speed up the back-off timer, etc. For example, stopping the back-off timer may include reducing the time remaining on the back-off timer to zero. As another example, speeding up or shortening the back-off timer may include reducing the time remaining on the back-off timer in accordance with functions, operations, etc. specified by back-off timer policies 105. For example, if two minutes remain on the back-off timer, speeding up or shortening the back-off timer may include setting the time remaining to one minute.

After the modified back-off timer has elapsed (e.g., after the timer has been stopped, shortened, etc. at 106), UE 101 may once again attempt (at 108) to reach network 103. In this example, UE 101 may be successful in reaching network 103 due to a change in conditions based on which the criteria specified by back-off timer policies 105 are associated. For example, as noted above, such criteria may be selected, determined, etc. based on conditions that are likely to increase the likelihood of UE 101 being able to access, connect to, reach, etc. network 103. In this example, the detection of these criteria may be based on real-world conditions, events, etc. that led to the increased ability of UE 101 to reach (e.g., connect to, communicate with, etc.) network 103, as compared to conditions that were present when UE 101 was unable to reach (at 102) network 103. As such, UE 101 does not have to wait for the full duration of the back-off timer (initiated at 104) before reattempting to reach network 103, as the reasons for initiating such timer are no longer present.

Figure 2:
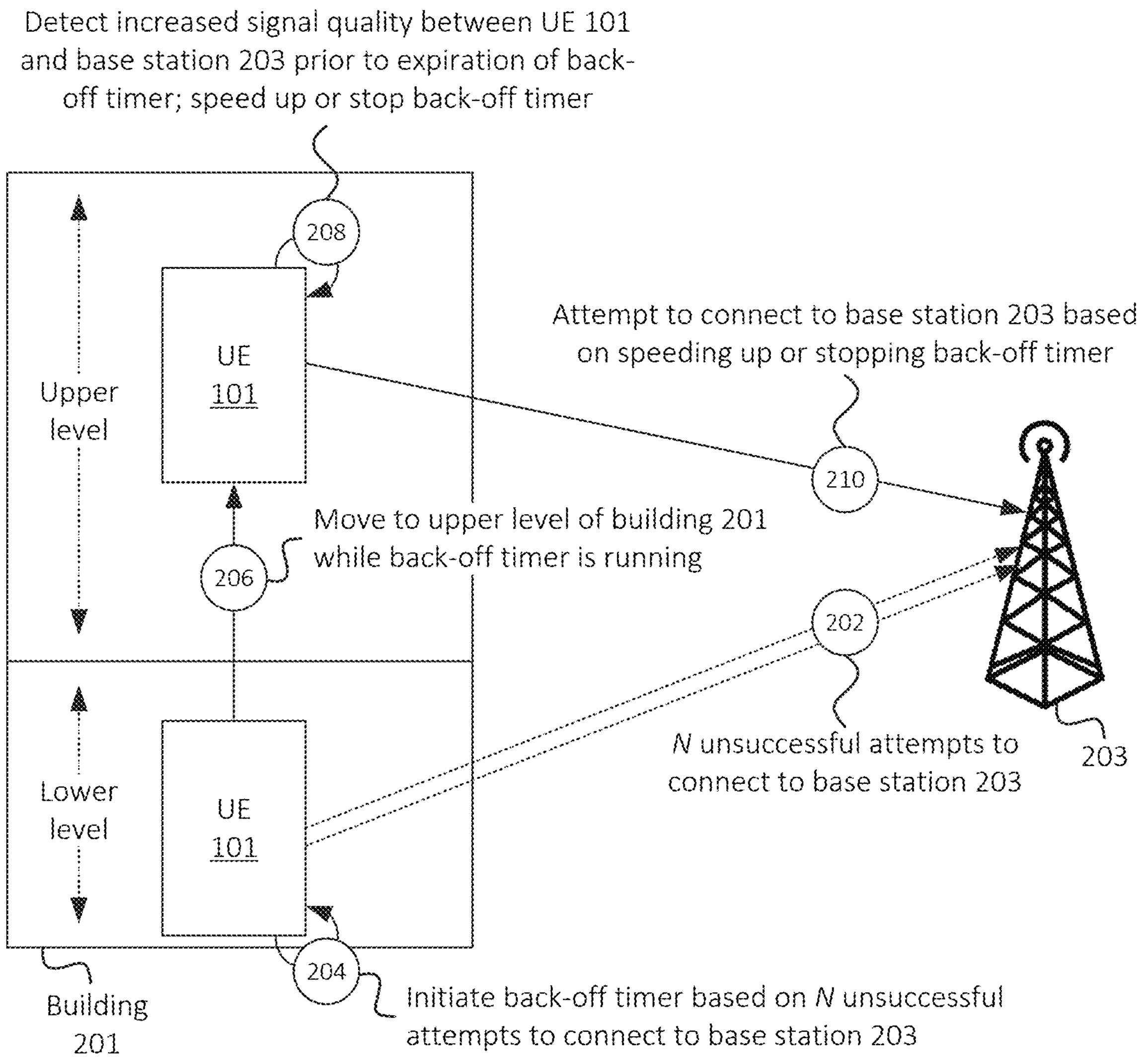
FIGS. 2-5 illustrate example scenarios of modifying a back-off timer, in accordance with some embodiments.

FIG. 2 illustrates an example scenario in which UE 101 may initiate a back-off timer and subsequently modify the back-off timer based on detecting that one or more criteria specified by back-off timer policies 105 are met. In this example, assume that UE 101 is located inside a particular building 201. Further assume that, for some time, UE 101 is on a lower level of building 201, such as in a basement of building 201. While UE 101 is on the lower level of building 201, UE 101 may attempt (at 202) to connect to wireless network infrastructure equipment of network 103, such as a particular base station 203 of a RAN of network 103. In this example, UE 101 may make a particular quantity (N) of attempts to connect to base station 203, such as N Radio Resource Control ("RRC") messages, N attachment requests, N RACH requests, etc. The attempts may be unsuccessful due to, for example, wireless signal loss caused by the presence of walls, floors, metal pipes, etc. when UE 101 is in the lower level of building 201.

UE 101 may further monitor or maintain information associated with wireless signal strength or quality metrics while UE 101 is on the lower level of building 201. For example, UE 101 may determine that a measure of signal strength or quality of received signals from base station 203 is relatively low. Additionally, or alternatively, UE 101 may be "aware" that UE 101 is on the lower level based on geofencing techniques, altitude detection techniques (e.g., using an integrated barometer, altimeter, etc.), or other suitable techniques.

UE 101 may further be configured to initiate (at 204) a back-off timer after a particular threshold quantity (e.g., N) of unsuccessful attempts to connect to base station 203. As discussed above, the back-off timer may be set to a particular duration, during which UE 101 refrains from attempting to connect to base station 203. While the back-off timer is running (e.g., prior to expiration of the back-off timer, before the duration of the back-off timer has elapsed, etc.), UE 101 may move (at 206) to an upper level of building 201.

UE 101 may detect (at 208) an increase in signal strength or quality metrics between UE 101 and base station 203 after moving (at 206) to the upper floor of building 201. Such increase may be due to, for example, fewer obstructions that caused wireless signal loss when UE 101 was located on the lower level of building 201 (e.g., walls, floors, metal pipes, etc.), or due to other factors related to the movement of UE 101. Additionally, or alternatively, UE 101 may detect vertical movement using geofencing techniques, altitude detection techniques, etc. In some embodiments, UE 101 may detect an amount of movement of UE 101 (e.g., a distance in terms of vertical movement, horizontal movement, or movement in three dimensions) when UE 101 moves (at 206) from the lower level of building 201 to the upper level.

UE 101 may further detect that one or more conditions specified by back-off timer policies 105 have been met based on moving (at 206) to the upper level of building 201. For example, UE 101 may detect, after moving to the upper level, that signal strength or quality metrics between UE 101 and base station 203 exceed one or more thresholds specified by back-off timer policies 105. As another example, UE 101 may compare a first set of signal strength or quality metrics, when UE 101 was located on the lower level, to a second set of signal strength or quality metrics when UE 101 has moved to the upper level, and may determine that an amount of difference between the first and second sets of signal strength or quality metrics exceeds a threshold difference specified by back-off timer policies 105. As another example, UE 101 may determine that an amount of vertical, horizontal, and/or three-dimensional movement of UE 101 exceeds a threshold amount of movement specified by one or more back-off timer policies 105. As yet another example, UE 101 may determine that a current altitude, elevation, floor of building 201 on which UE 101 is located, etc., satisfies criteria specified by back-off timer policies 105.

Accordingly, UE 101 may modify (at 208) the back-off timer, such as by stopping, shortening, speeding up, etc. such timer. Based on modifying the back-off timer, UE 101 may reattempt (at 210) to connect to base station 203 (i.e., prior to the original expiration of the timer as initiated at 204). As noted above, the attempt (at 210) to connect to base station 203 may be successful due to factors such as increased wireless signal or quality metrics between UE 101 and base station 203 resulting from the movement of UE 101 while the back-off timer was running.

Figure 3:
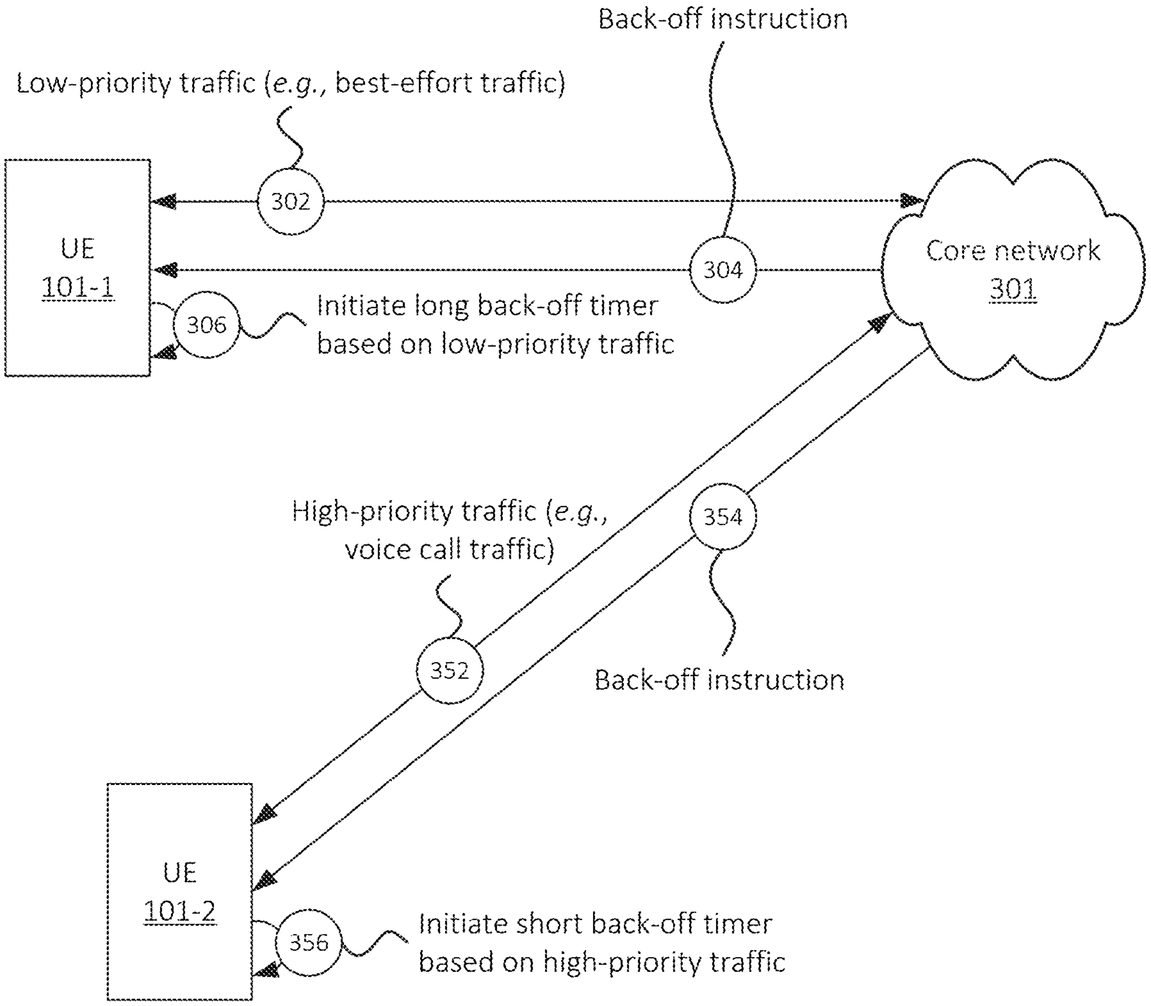

As shown in FIG. 3, an instruction from network 103 may be used to initiate a back-off timer. Further, the same instruction may be handled differently in different situations and/or for different UEs 101, in accordance with back-off timer policies 105 maintained by such UEs 101. For example, a first UE 101-1 may be in communication (at 302) with core network 301 (e.g., a core of network 103). Such communication may include one or more PDU sessions between UE 101-1 and an Internet Protocol ("IP") gateway of core network 301, such as a User Plane Function ("UPF"), a Packet Data Network ("PDN") gateway ("PGW"), or the like. The communications between UE 101-1 include traffic associated with a first priority level (e.g., a first QoS Class Identifier ("QCI"), a first network slice, etc.). For this example, assume that such communications are considered "low" priority.

At some point while the communications between UE 101-1 and core network 301 are active, core network 301 may output (at 304) a back-off instruction to UE 101-1. For example, core network 301 may be congested, and may issue such instruction to UE 101-1 and/or one or more other UEs 101 in order to alleviate the congestion. Based on the instruction, UE 101-1 may initiate (at 306) a back-off timer, during which UE 101-1 will cease communicating with core network 301 (e.g., may forgo outputting traffic to core network 301), and after which UE 101-1 may begin to continue communicating with core network 301. In this example, UE 101-1 may set the duration to a relatively "long" duration based on identifying that communications between UE 101-1 and core network 301 are of a low priority. For example, back-off timer policies 105, maintained by UE 101-1, may indicate that in response to a back-off instruction from core network 301, the duration of the back-off timer is based on a priority level (e.g., QCI, network slice, traffic or service type, etc.) of communications between UE 101-1 and core network 301.

Further, a second UE 101-2 may also be in communication (at 352) with core network 301, where such communications include a different priority level, service type, network slice, etc. than the communications between UE 101-1 and core network 301. In this example, assume that such traffic between UE 101-2 and core network 301 is considered "high" priority traffic. Core network 301 may also issue (at 354) a back-off instruction to UE 101-2 (e.g., at the same time as the instruction to UE 101-1, or at some different time). UE 101-2 may initiate (at 356) a back-off timer based on the instruction (at 354) from core network 301. The back-off timer initiated (at 356) by UE 101-2 may be of a different duration than the back-off timer initiated (at 306) by UE 101-1 in response to the same or similar instruction from core network 301. For example, UE 101-2 may identify (e.g., based on back-off timer policies 105) that the back-off timer should be a relatively "short" duration based on the high-priority traffic associated with the communications (at 352) between UE 101-2 and core network 301. As noted above, while the back-off timer is running UE 101-2 may refrain from (e.g., may forgo) communicating with core network 301, and may communicate with core network 301 after expiration of the back-off timer.

In some embodiments, the back-off timer referred to in FIG. 3 may also be modified (e.g., shortened, stopped, etc.) based on one or more factors or criteria specified in back-off timer policies 105. In some embodiments, such factors or criteria may include receiving a subsequent instruction or indication from core network 301 that core network 301 is no longer congested, and/or otherwise some revocation of the back-off instruction (sent at 304 and/or 354) by core network 301.

Figure 4:
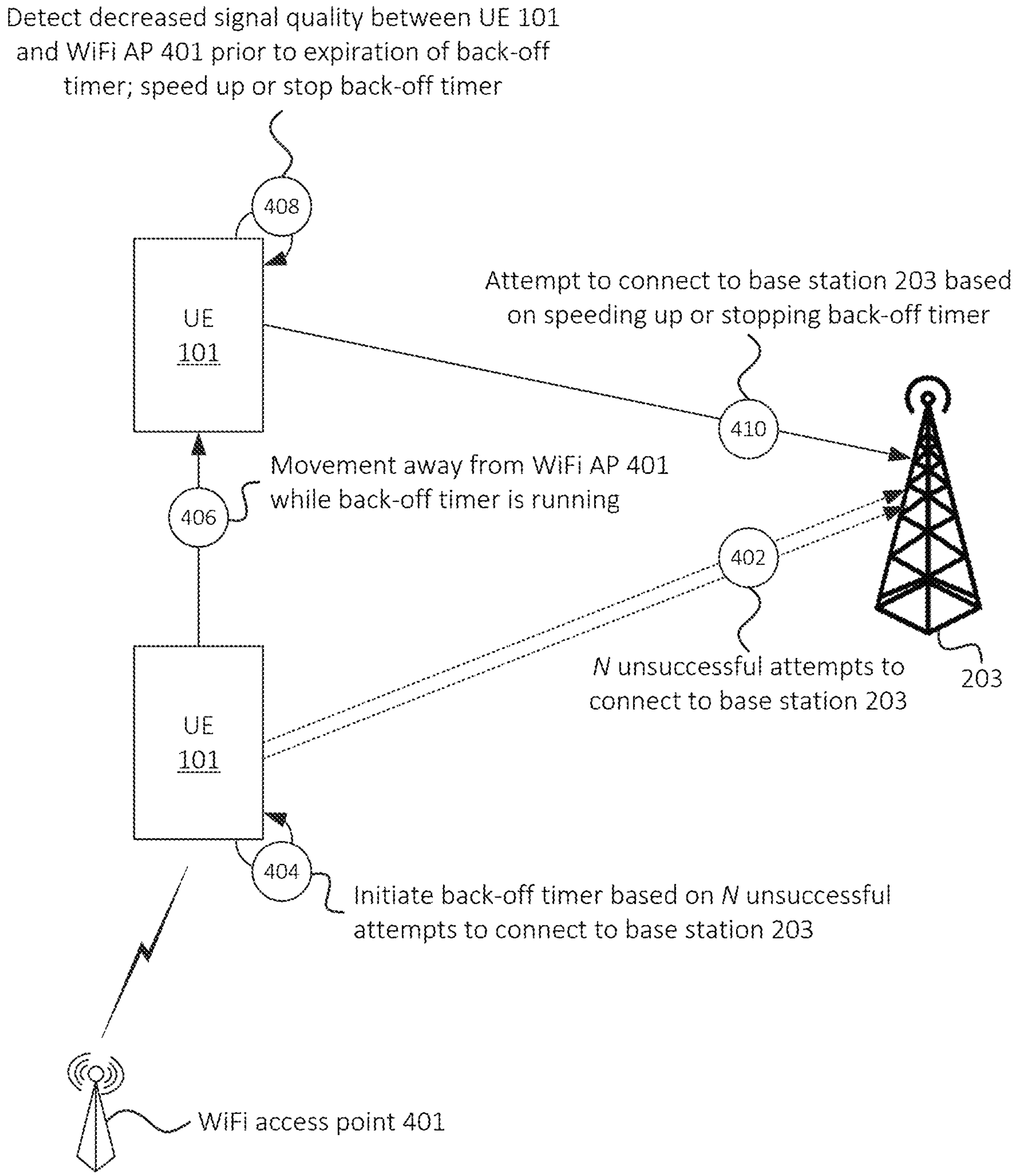

In some embodiments, wireless signal strength or quality metrics between UE 101 and a network other than network 103 may be specified as criteria (e.g., by back-off timer policies 105) based on which a back-off timer should be modified. For example, as shown in FIG. 4, UE 101 may be connected to a WLAN, a WiFi network, etc. via WiFi access point ("AP") 401 or some other suitable wireless network infrastructure equipment. While UE 101 is connected to WiFi AP 401, UE 101 may also attempt (at 402) to connect to base station 203. For example, UE 101 may attempt to maintain an active connection with base station 203 in order to provide for seamless handover from WiFi AP 401 to base station 203 in situations where connectivity between UE 101 and WiFi AP 401 is lost (e.g., if UE 101 moves out of communication range of WiFi AP 401, if WiFi AP 401 is powered off, etc.). In this example, UE 101 may be unsuccessful (at 402) in connecting to base station 203 due to low signal quality between UE 101 and base station 203 and/or other factors. Accordingly, UE 101 may initiate (at 404) a back-off timer, during which UE 101 will refrain from attempting to connect to base station 203.

At some point while the back-off timer is running (e.g., prior to expiration of the back-off timer), UE 101 may move (at 406) away from WiFi AP 401. Due to the movement away from WiFi AP 401 (and/or other factors) and while the back-off timer is running, UE 101 may detect (at 408) a decreased signal quality or strength between UE 101 and WiFi AP 401. UE 101 may identify that one or more back-off timer policies 105 specify that if signal strength or quality metrics between UE 101 and a network other than network 103 are below a threshold, and/or if such metrics decrease by at least a threshold amount, that a back-off timer implemented by UE 101 should be modified (e.g., shortened, sped up, stopped, etc.). UE 101 may accordingly modify (at 408) the back-off timer (initiated at 404) based on determining that the signal strength or quality between UE 101 and WiFi AP 401 is below a threshold and/or has decreased by at least a threshold amount, and may attempt (at 410) to connect to base station 203 upon expiration of the modified back-off timer.

In the above scenario, the modification of the back-off timer due to the decreased signal quality between UE 101 and WiFi AP 401 may reflect the likelihood that one or more services at UE 101 (e.g., voice call services, gaming services, etc.) may be interrupted if UE 101 loses connectivity with WiFi AP 401 and does not have a connection to base station 203 available for a fast and/or seamless handover procedure.

Figure 5:
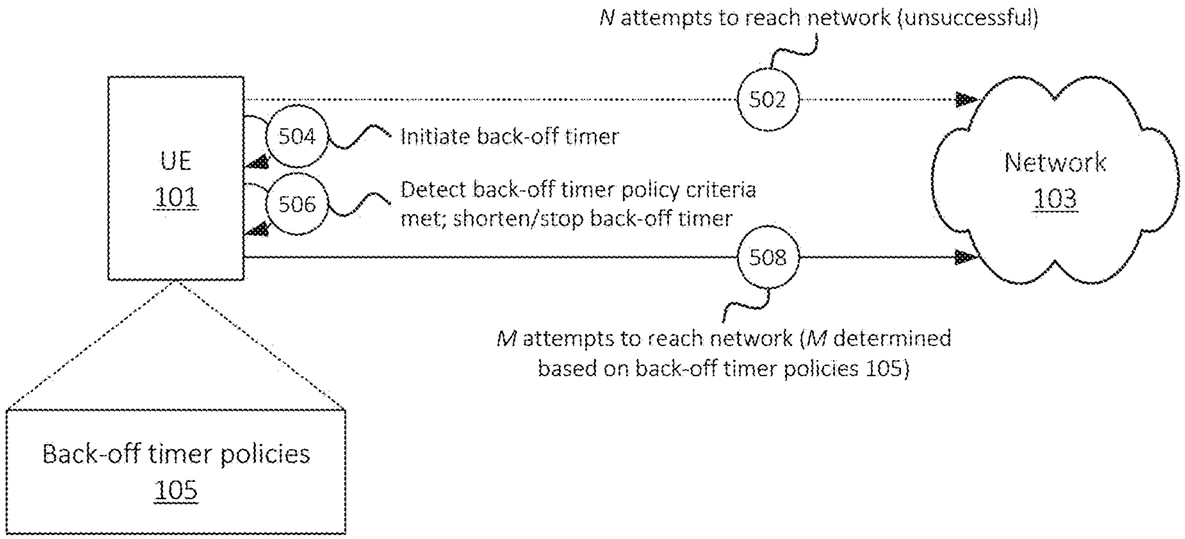

As noted above, the manner in which UE 101 attempts to reconnect to network 103, after the expiration of a back-off timer, may also be specified by one or more back-off timer policies 105. For example, as shown in FIG. 5, UE 101 may initiate (at 504) a back-off timer after a first quantity (N) of attempts (at 502) to reach network 103. UE 101 may further detect (at 506) that one or more criteria specified by back-off timer policies 105 have been met, and may accordingly modify the back-off timer. After expiration of the modified back-off timer, UE 101 may again attempt (at 508) to reach network 103. In some embodiments, the quantity of attempts to reach (at 508) network 103 may be different than the quantity of initial attempts to reach (at 502) network 103. For example, UE 101 may attempt (at 508) to reach network 103 M times, which may be a greater or smaller quantity than N, in different scenarios. Back-off timer policies 105 may, for example, specify the different quantity based on various factors, such as a location of UE 101, traffic or service types associated with UE 101, wireless signal strength or quality metrics between UE 101 and network 103, etc. In the event that UE 101 is unsuccessful in reaching network 103 after M attempts (at 508), UE 101 may again initiate a back-off timer, during which UE 101 refrains from attempting to connect to network 103. Such back-off timer may be the same duration or a different duration than the initial back-off timer (initiated at 504) and/or the modified back-off timer (modified at 506), in accordance with back-off timer policies 105.

Figure 6:
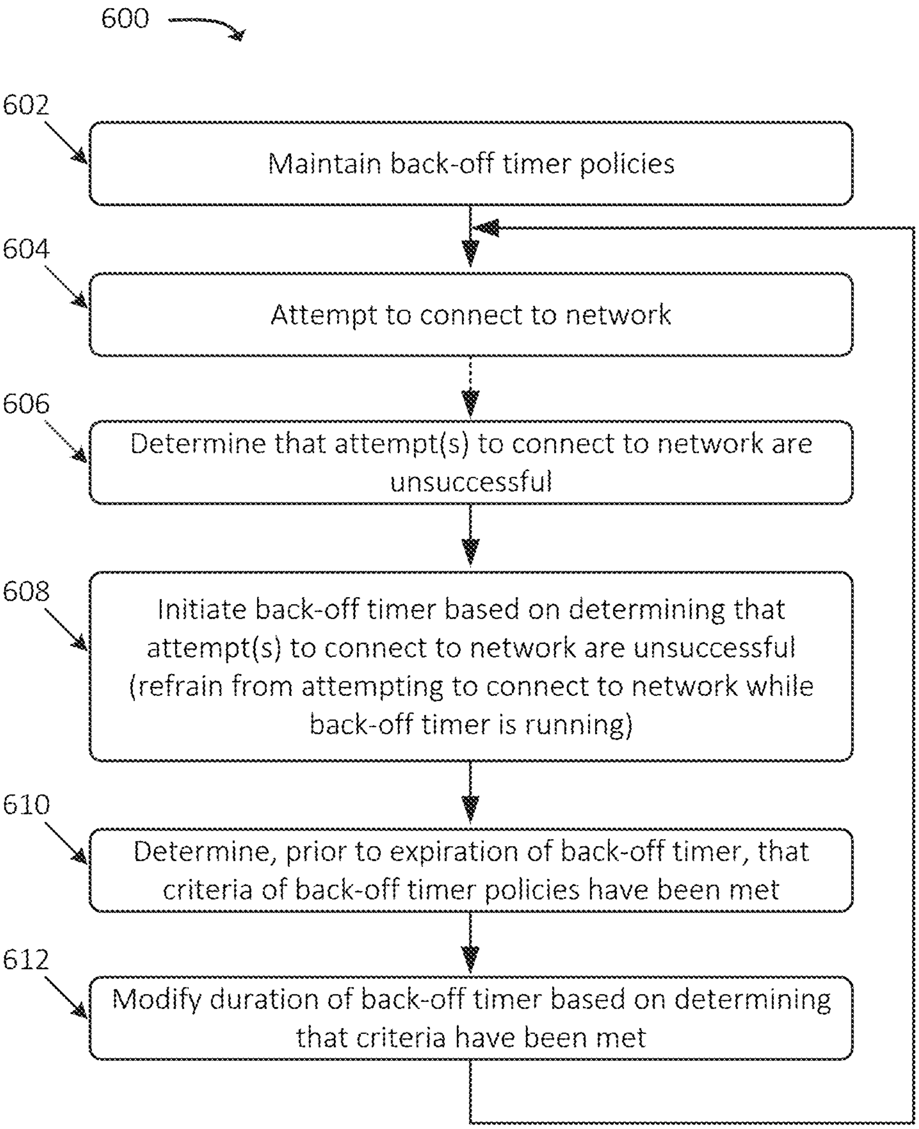
FIG. 6 illustrates an example process for modifying a back-off timer, in accordance with some embodiments.

FIG. 6 illustrates an example process 600 for modifying a back-off timer based on back-off timer policies 105, in accordance with some embodiments. In some embodiments, some or all of process 600 may be performed by UE 101.

As shown, process 600 may include maintaining (at 602) a set of back-off timer policies 105. For example, as discussed above, UE 101 may receive such back-off timer policies 105 as part of an OTA update procedure, a provisioning and/or configuration procedure, etc. Back-off timer policies 105 may include criteria, conditions, rules, policies, etc. specifying when a back-off timer is to be modified (e.g., shortened, sped up, stopped, etc.), a duration of a back-off timer (e.g., different durations may be associated with different factors such as traffic or service type, UE location, etc.), and/or a manner in which reattempts should be made after expiration of a back-off timer (e.g., a quantity of attempts to reconnect to network 103 after expiration of the back-off timer).

Process 600 may further include attempting (at 604) to connect to network 103. For example, as discussed above, UE 101 may attempt to establish a wireless connection with base station 203 of network 103, may attempt to establish a PDU session with an IP gateway of core network 301, etc. Such attempts may include, for example, RRC messages, Non-Access Stratum ("NAS") signaling, and/or other types of messages or requests.

Process 600 may additionally include determining (at 606) that the attempt (or attempts) to connect to network 103 are unsuccessful. For example, UE 101 may determine that network 103 has rejected one or more connection requests, has not responded to one or more connection requests, etc. As discussed above, determining that the attempt(s) to connect to network 103 are unsuccessful may include determining that a particular quantity of messages, requests, etc. have been sent by UE 101 without the requested connection being established between UE 101 and network 103.

Process 600 may also include initiating (at 608) a back-off timer based on determining that the attempt(s) to connect to network 103 were unsuccessful. As discussed above, UE 101 may refrain from, may forgo, etc. attempting to connect to or otherwise communicate with network 103 while the back-off timer is running. For example, the back-off timer may be associated with a particular duration and, upon initiation, may be configured to run for such duration. After the duration has elapsed, the back-off timer may be considered to have expired.

Process 600 may further include determining (at 610), prior to expiration of the back-off timer, that one or more criteria of back-off timer policies 105 have been met. For example, as discussed above, UE 101 may determine that a location of UE 101 matches a location specified in back-off timer policies 105, that wireless signal strength or quality metrics between UE 101 and network 103 and/or some other network exceed one or more thresholds, etc.

Process 600 may additionally include modifying (at 612) a duration of the back-off timer based on determining that such criteria have been met. For example, UE 101 may shorten, speed up, stop, etc. the back-off timer based on detecting that the one or more criteria of back-off timer policies 105 have been met. Upon expiration of the modified back-off timer (which may happen sooner than if the back-off timer were not modified), UE 101 may again attempt (at 604) to connect to network 103. As discussed above, in situations where the subsequent attempt to connect to network 103 is successful, operations 606-612 may not be repeated (as denoted by the dashed arrow between operations 604 and 606 in the figure). On the other hand, in situations where the subsequent attempt to connect to network 103 is unsuccessful, one or more operations 606-612 may be repeated, such that UE 101 may again initiate a back-off timer (e.g., which may be the same duration or a different duration than the initial back-off timer) in order to prevent excessive retry attempts, thus conserving network resources and UE battery life.

Figure 7:
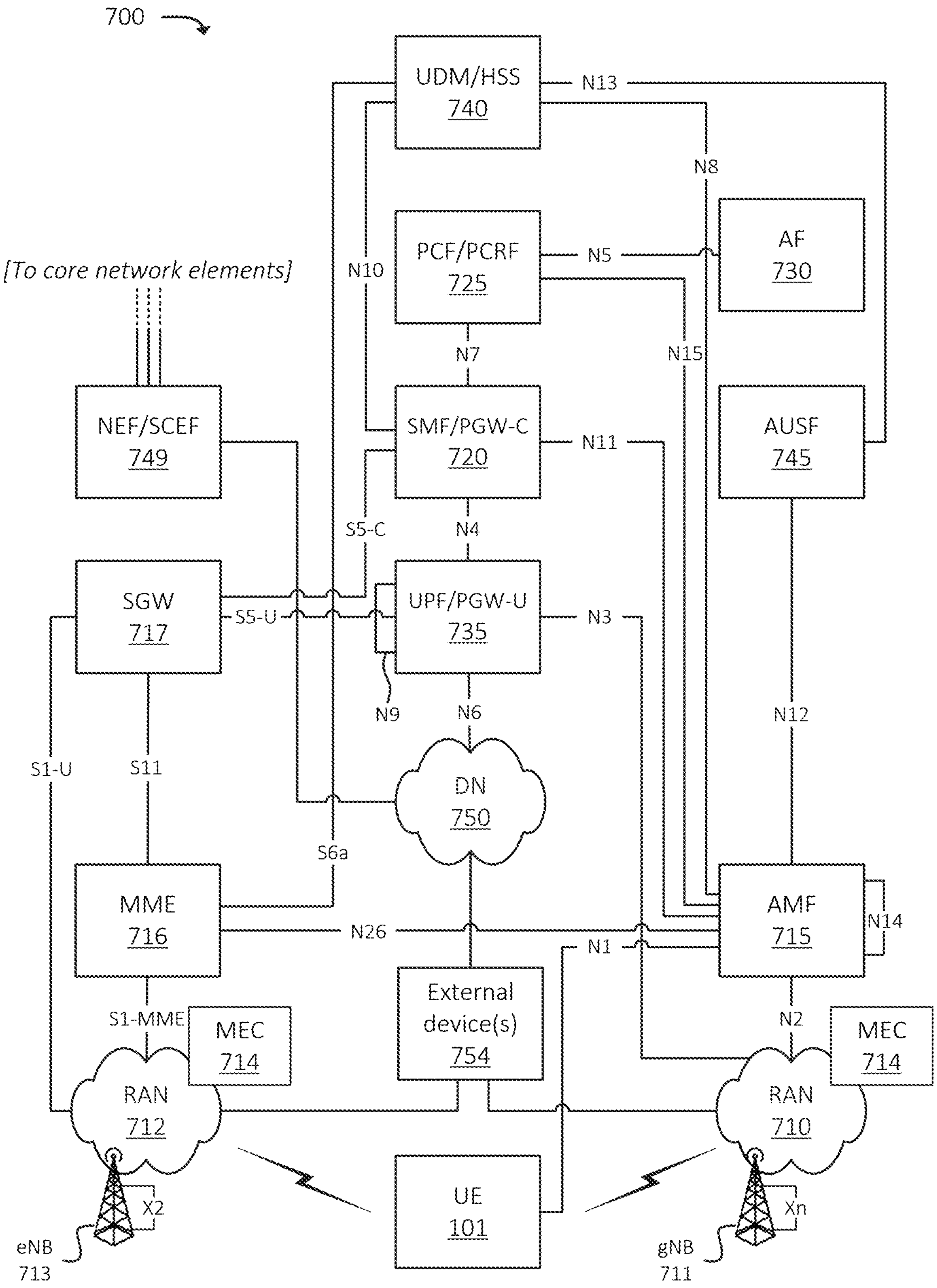
FIGS. 7 and 8 illustrate example environments in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 700 may represent or may include a 5G core ("5GC"). As shown, environment 700 may include UE 101, RAN 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/PGW-Control plane function ("PGW-C") 720, Policy Control Function ("PCF")/Policy Charging and Rules Function ("PCRF") 725, Application Function ("AF") 730, UPF/PGW-User plane function ("PGW-U") 735, Unified Data Management ("UDM")/Home Subscriber Server ("HSS") 740, Authentication Server Function ("AUSF") 745, and Network Exposure Function ("NEF")/Service Capability Exposure Function ("SCEF") 749. Environment 700 may also include one or more networks, such as Data Network ("DN") 750. Environment 700 may include one or more additional devices or systems communicatively coupled to one or more networks (e.g., DN 750), such as one or more external devices 754.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of AMF 715, SMF/PGW-C 720, PCF/PCRF 725, and/or UPF/PGW-U 735, while another slice may include a second instance of AMF 715, SMF/PGW-C 720, PCF/PCRF 725, and/or UPF/PGW-U 735). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Additionally, one or more elements of environment 700 may be implemented in a virtualized and/or containerized manner. For example, one or more of the elements of environment 700 may be implemented by one or more Virtualized Network Functions ("VNFs"), Cloud-Native Network Functions ("CNFs"), etc. In such embodiments, environment 700 may include, may implement, and/or may be communicatively coupled to an orchestration platform that provisions hardware resources, installs containers or applications, performs load balancing, and/or otherwise manages the deployment of such elements of environment 700. In some embodiments, such orchestration and/or management of such elements of environment 700 may be performed by, or in conjunction with, the open-source Kubernetes® application programming interface ("API") or some other suitable virtualization, containerization, and/or orchestration system.

Elements of environment 700 may interconnect with each other and/or other devices via wired connections, wireless connections, or a combination of wired and wireless connections. Examples of interfaces or communication pathways between the elements of environment 700, as shown in FIG. 7, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 7, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 700 may be, may include, may be implemented by, and/or may be communicatively coupled to network 103.

UE 101 may include a computation and communication device, such as a wireless mobile communication device that is capable of communicating with RAN 710, RAN 712, and/or DN 750. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a programmable logic controller or other industrial controller, a Machine-to-Machine ("M2M") device, or the like), a Fixed Wireless Access ("FWA") device, or another type of mobile computation and communication device. UE 101 may send traffic to and/or receive traffic (e.g., user plane traffic) from DN 750 via RAN 710, RAN 712, and/or UPF/PGW-U 735.

RAN 710 may be, or may include, a 5G RAN that implements a 5G RAT and that includes one or more base stations (e.g., one or more gNBs 711), via which UE 101 may communicate with one or more other elements of environment 700. UE 101 may communicate with RAN 710 via an air interface (e.g., as provided by gNB 711). For instance, RAN 710 may receive traffic (e.g., user plane traffic such as voice call traffic, data traffic, messaging traffic, etc.) from UE 101 via the air interface, and may communicate the traffic to UPF/PGW-U 735 and/or one or more other devices or networks. Further, RAN 710 may receive signaling traffic, control plane traffic, etc. from UE 101 via the air interface, and may communicate such signaling traffic, control plane traffic, etc. to AMF 715 and/or one or more other devices or networks. Additionally, RAN 710 may receive traffic intended for UE 101 (e.g., from UPF/PGW-U 735, AMF 715, and/or one or more other devices or networks) and may communicate the traffic to UE 101 via the air interface. In some embodiments, base station 203 may be, may include, and/or may be implemented by one or more gNBs 711.

RAN 712 may be, or may include, an LTE RAN that implements an LTE RAT and that includes one or more base stations (e.g., one or more eNBs 713), via which UE 101 may communicate with one or more other elements of environment 700. UE 101 may communicate with RAN 712 via an air interface (e.g., as provided by eNB 713). For instance, RAN 712 may receive traffic (e.g., user plane traffic such as voice call traffic, data traffic, messaging traffic, signaling traffic, etc.) from UE 101 via the air interface, and may communicate the traffic to UPF/PGW-U 735 (e.g., via SGW 717) and/or one or more other devices or networks. Further, RAN 712 may receive signaling traffic, control plane traffic, etc. from UE 101 via the air interface, and may communicate such signaling traffic, control plane traffic, etc. to MME 716 and/or one or more other devices or networks. Additionally, RAN 712 may receive traffic intended for UE 101 (e.g., from UPF/PGW-U 735, MME 716, SGW 717, and/or one or more other devices or networks) and may communicate the traffic to UE 101 via the air interface. In some embodiments, base station 203 may be, may include, and/or may be implemented by one or more eNBs 713.

One or more RANs of environment 700 (e.g., RAN 710 and/or RAN 712) may include, may implement, and/or may otherwise be communicatively coupled to one or more edge computing devices, such as one or more Multi-Access/Mobile Edge Computing ("MEC") devices (referred to sometimes herein simply as "MECs") 714. MECs 714 may be co-located with wireless network infrastructure equipment of RANs 710 and/or 712 (e.g., one or more gNBs 711 and/or one or more eNBs 713, respectively). Additionally, or alternatively, MECs 714 may otherwise be associated with geographical regions (e.g., coverage areas) of wireless network infrastructure equipment of RANs 710 and/or 712. In some embodiments, one or more MECs 714 may be implemented by the same set of hardware resources, the same set of devices, etc. that implement wireless network infrastructure equipment of RANs 710 and/or 712. In some embodiments, one or more MECs 714 may be implemented by different hardware resources, a different set of devices, etc. from hardware resources or devices that implement wireless network infrastructure equipment of RANs 710 and/or 712. In some embodiments, MECs 714 may be communicatively coupled to wireless network infrastructure equipment of RANs 710 and/or 712 (e.g., via a high-speed and/or low-latency link such as a physical wired interface, a high-speed and/or low-latency wireless interface, or some other suitable communication pathway).

MECs 714 may include hardware resources (e.g., configurable or provisionable hardware resources) that may be configured to provide services and/or otherwise process traffic to and/or from UE 101, via RAN 710 and/or 712. For example, RAN 710 and/or 712 may route some traffic from UE 101 (e.g., traffic associated with one or more particular services, applications, application types, etc.) to a respective MEC 714 instead of to core network elements of environment 700 (e.g., UPF/PGW-U 735). MEC 714 may accordingly provide services to UE 101 by processing such traffic, performing one or more computations based on the received traffic, and providing traffic to UE 101 via RAN 710 and/or 712. MEC 714 may include, and/or may implement, some or all of the functionality described above with respect to UPF/PGW-U 735, AF 730, one or more application servers, and/or one or more other devices, systems, VNFs, CNFs, etc. In this manner, ultra-low latency services may be provided to UE 101, as traffic does not need to traverse links (e.g., backhaul links) between RAN 710 and/or 712 and the core network.

AMF 715 may include one or more devices, systems, VNFs, CNFs, etc., that perform operations to register UE 101 with the 5G network, to establish bearer channels associated with a session with UE 101, to hand off UE 101 from the 5G network to another network, to hand off UE 101 from the other network to the 5G network, to manage mobility of UE 101 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, to manage mobility of UE 101 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 101. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 101, from DN 750, and may forward the user plane data toward UE 101 (e.g., via RAN 710, SMF/PGW-C 720, and/or one or more other devices). In some embodiments, multiple instances of UPF/PGW-U 735 may be deployed (e.g., in different geographical locations), and the delivery of content to UE 101 may be coordinated via the N9 interface (e.g., as denoted in FIG. 7 by the line marked "N9" originating and terminating at UPF/PGW-U 735). Similarly, UPF/PGW-U 735 may receive traffic from UE 101 (e.g., via RAN 710, RAN 712, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. In some embodiments, UDM/HSS 740 may include, may implement, may be communicatively coupled to, and/or may otherwise be associated with some other type of repository or database, such as a Unified Data Repository ("UDR"). AUSF 745 and/or UDM/HSS 740 may perform authentication, authorization, and/or accounting operations associated with one or more UEs 101 and/or one or more communication sessions associated with one or more UEs 101.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 101 may communicate, through DN 750, with data servers, other UEs 101, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 101 may communicate.

External devices 754 may include one or more devices or systems that communicate with UE 101 via DN 750 and one or more elements of environment 700 (e.g., via UPF/PGW-U 735). External devices 754 may include, for example, one or more application servers, content provider systems, web servers, or the like. External devices 754 may, for example, implement "server-side" applications that communicate with "client-side" applications executed by UE 101. External devices 754 may provide services to UE 101 such as gaming services, videoconferencing services, messaging services, email services, web services, and/or other types of services.

In some embodiments, external devices 754 may communicate with one or more elements of environment 700 (e.g., core network elements) via NEF/SCEF 749. NEF/SCEF 749 may include one or more devices, systems, VNFs, CNFs, etc. that provide access to information, APIs, and/or other operations or mechanisms of one or more core network elements to devices or systems that are external to the core network (e.g., to external device 754 via DN 750). NEF/SCEF 749 may maintain authorization and/or authentication information associated with such external devices or systems, such that NEF/SCEF 749 is able to provide information, that is authorized to be provided, to the external devices or systems. For example, a given external device 754 may request particular information associated with one or more core network elements. NEF/SCEF 749 may authenticate the request and/or otherwise verify that external device 754 is authorized to receive the information, and may request, obtain, or otherwise receive the information from the one or more core network elements. In some embodiments, NEF/SCEF 749 may include, may implement, may be implemented by, may be communicatively coupled to, and/or may otherwise be associated with a Security Edge Protection Proxy ("SEPP"), which may perform some or all of the functions discussed above. External device 754 may, in some situations, subscribe to particular types of requested information provided by the one or more core network elements, and the one or more core network elements may provide (e.g., "push") the requested information to NEF/SCEF 749 (e.g., on a periodic or otherwise ongoing basis).

In some embodiments, external devices 754 may communicate with one or more elements of RAN 710 and/or 712 via an API or other suitable interface. For example, a given external device 754 may provide instructions, requests, etc. to RAN 710 and/or 712 to provide one or more services via one or more respective MECs 714. In some embodiments, such instructions, requests, etc. may include QoS parameters, Service Level Agreements ("SLAs"), etc. (e.g., maximum latency thresholds, minimum throughput thresholds, etc.) associated with the services.

Figure 8:
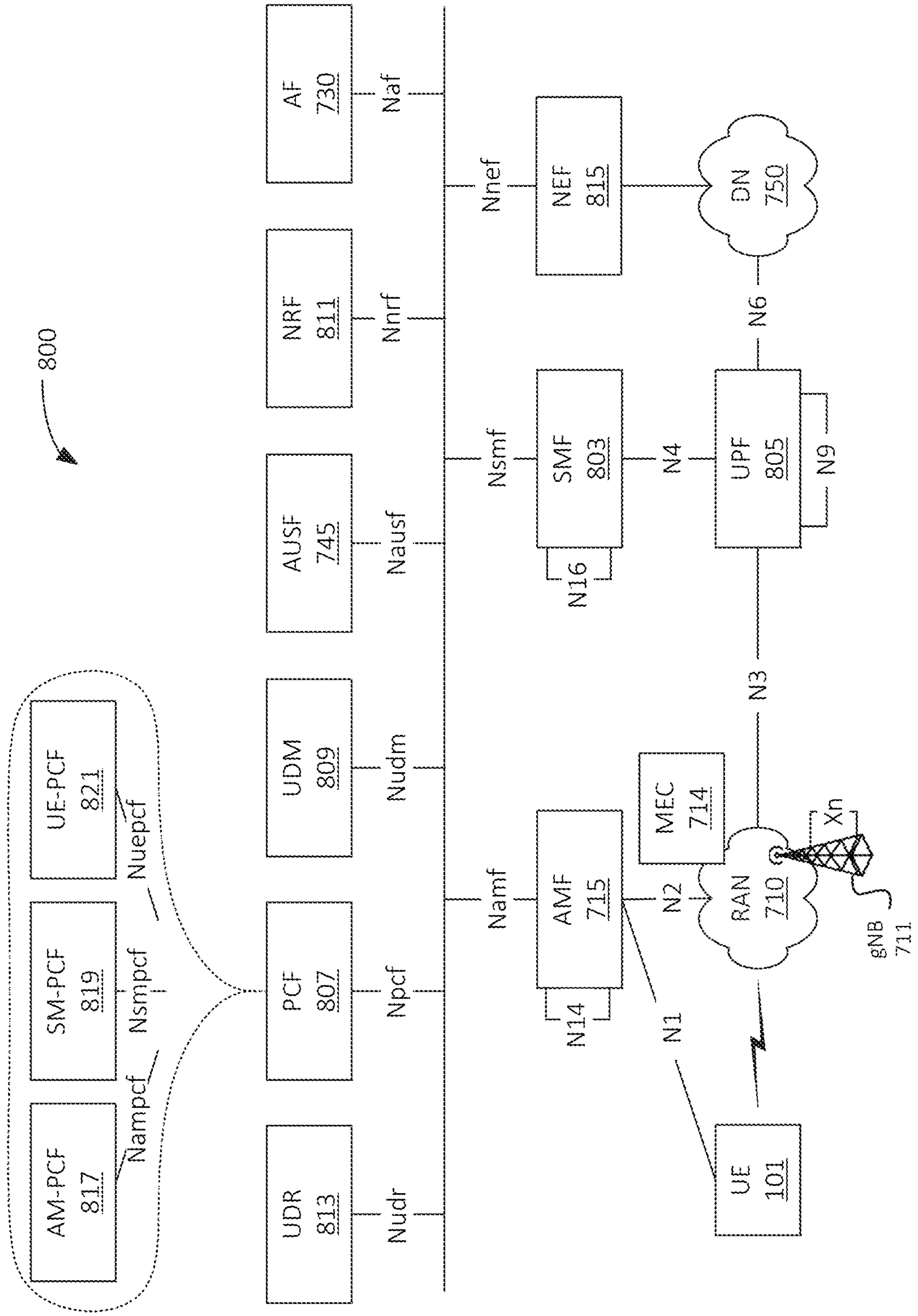

FIG. 8 illustrates another example environment 800, in which one or more embodiments may be implemented. In some embodiments, environment 800 may correspond to a 5G network, and/or may include elements of a 5G network. In some embodiments, environment 800 may correspond to a 5G SA architecture. In some embodiments, environment 800 may include a 5GC, in which 5GC network elements perform one or more operations described herein.

As shown, environment 800 may include UE 101, RAN 710 (which may include one or more gNBs 711 or other types of wireless network infrastructure) and various network functions, which may be implemented as VNFs, CNFs, etc. Such network functions may include AMF 715, SMF 803, UPF 805, PCF 807, UDM 809, AUSF 745, Network Repository Function ("NRF") 811, AF 730, UDR 813, and NEF 815. Environment 800 may also include or may be communicatively coupled to one or more networks, such as DN 750.

The example shown in FIG. 8 illustrates one instance of each network component or function (e.g., one instance of SMF 803, UPF 805, PCF 807, UDM 809, AUSF 745, etc.). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF 803, PCF 807, UPF 805, etc., while another slice may include a second instance of SMF 803, PCF 807, UPF 805, etc.). Additionally, or alternatively, one or more of the network functions of environment 800 may implement multiple network slices. The different slices may provide differentiated levels of service, such as service in accordance with different QoS parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Elements of environment 800 may interconnect with each other and/or other devices via wired connections, wireless connections, or a combination of wired and wireless connections. Examples of interfaces or communication pathways between the elements of environment 800, as shown in FIG. 8, may include interfaces shown in FIG. 8 and/or one or more interfaces not explicitly shown in FIG. 8. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 800 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 715), an Nudm interface (e.g., indicating communications to be routed to UDM 809), an Npcf interface, an Nupf interface, an Nnef interface, an Nsmf interface, an Nnrf interface, an Nudr interface, an Naf interface, and/or one or more other SBIs. In some embodiments, environment 800 may be, may include, may be implemented by, and/or may be communicatively coupled to network 103.

UPF 805 may include one or more devices, systems, VNFs, CNFs, etc., that receive, route, process, and/or forward traffic (e.g., user plane traffic). As discussed above, UPF 805 may communicate with UE 101 via one or more communication sessions, such as PDU sessions. Such PDU sessions may be associated with a particular network slice or other suitable QoS parameters, as noted above. UPF 805 may receive downlink user plane traffic (e.g., voice call traffic, data traffic, etc. destined for UE 101) from DN 750, and may forward the downlink user plane traffic toward UE 101 (e.g., via RAN 710). In some embodiments, multiple UPFs 805 may be deployed (e.g., in different geographical locations), and the delivery of content to UE 101 may be coordinated via the N9 interface. Similarly, UPF 805 may receive uplink traffic from UE 101 (e.g., via RAN 710), and may forward the traffic toward DN 750. In some embodiments, UPF 805 may implement, may be implemented by, may be communicatively coupled to, and/or may otherwise be associated with UPF/PGW-U 735. In some embodiments, UPF 805 may communicate (e.g., via the N4 interface) with SMF 803, regarding user plane data processed by UPF 805 (e.g., to provide analytics or reporting information, to receive policy and/or authorization information, etc.).

PCF 807 may include one or more devices, systems, VNFs, CNFs, etc., that aggregate, derive, generate, etc. policy information associated with the 5GC and/or UEs 101 that communicate via the 5GC and/or RAN 710. PCF 807 may receive information regarding policies and/or subscriptions from one or more sources, such as subscriber databases (e.g., UDM 809, UDR 813, etc.), and/or from one or more users such as, for example, an administrator associated with PCF 807. In some embodiments, the functionality of PCF 807 may be split into multiple network functions or subsystems, such as access and mobility PCF ("AM-PCF") 817, session management PCF ("SM-PCF") 819, UE PCF ("UE-PCF") 821, and so on. Such different "split" PCFs may be associated with respective SBIs (e.g., AM-PCF 817 may be associated with an Nampcf SBI, SM-PCF 819 may be associated with an Nsmpcf SBI, UE-PCF 821 may be associated with an Nuepcf SBI, and so on) via which other network functions may communicate with the split PCFs. The split PCFs may maintain information regarding policies associated with different devices, systems, and/or network functions.

NRF 811 may include one or more devices, systems, VNFs, CNFs, etc. that maintain routing and/or network topology information associated with the 5GC. For example, NRF 811 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 813 may include one or more devices, systems, VNFs, CNFs, etc. that provide user and/or subscriber information, based on which PCF 807 and/or other elements of environment 800 may determine access policies, QoS policies, charging policies, or the like. In some embodiments, UDR 813 may receive such information from UDM 809 and/or one or more other sources.

NEF 815 may include one or more devices, systems, VNFs, CNFs, etc. that provide access to information, APIs, and/or other operations or mechanisms of the 5GC to devices or systems that are external to the 5GC. NEF 815 may maintain authorization and/or authentication information associated with such external devices or systems, such that NEF 815 is able to provide information, that is authorized to be provided, to the external devices or systems. Such information may be received from other network functions of the 5GC (e.g., as authorized by an administrator or other suitable entity associated with the 5GC), such as SMF 803, UPF 805, a charging function ("CHF") of the 5GC, and/or other suitable network function. NEF 815 may communicate with external devices or systems (e.g., external devices 754) via DN 750 and/or other suitable communication pathways.

While environment 800 is described in the context of a 5GC, as noted above, environment 800 may, in some embodiments, include or implement one or more other types of core networks. For example, in some embodiments, environment 800 may be or may include a converged packet core, in which one or more elements may perform some or all of the functionality of one or more 5GC network functions and/or one or more EPC network functions. For example, in some embodiments, AMF 715 may include, may implement, may be implemented by, and/or may otherwise be associated with MME 716; SMF 803 may include, may implement, may be implemented by, and/or may otherwise be associated with SGW 717; PCF 807 may include, may implement, may be implemented by, and/or may otherwise be associated with a PCRF (e.g., PCF/PCRF 725); NEF 815 may include, may implement, may be implemented by, and/or may otherwise be associated with a SCEF (e.g., NEF/SCEF 749); and so on.

Figure 9:
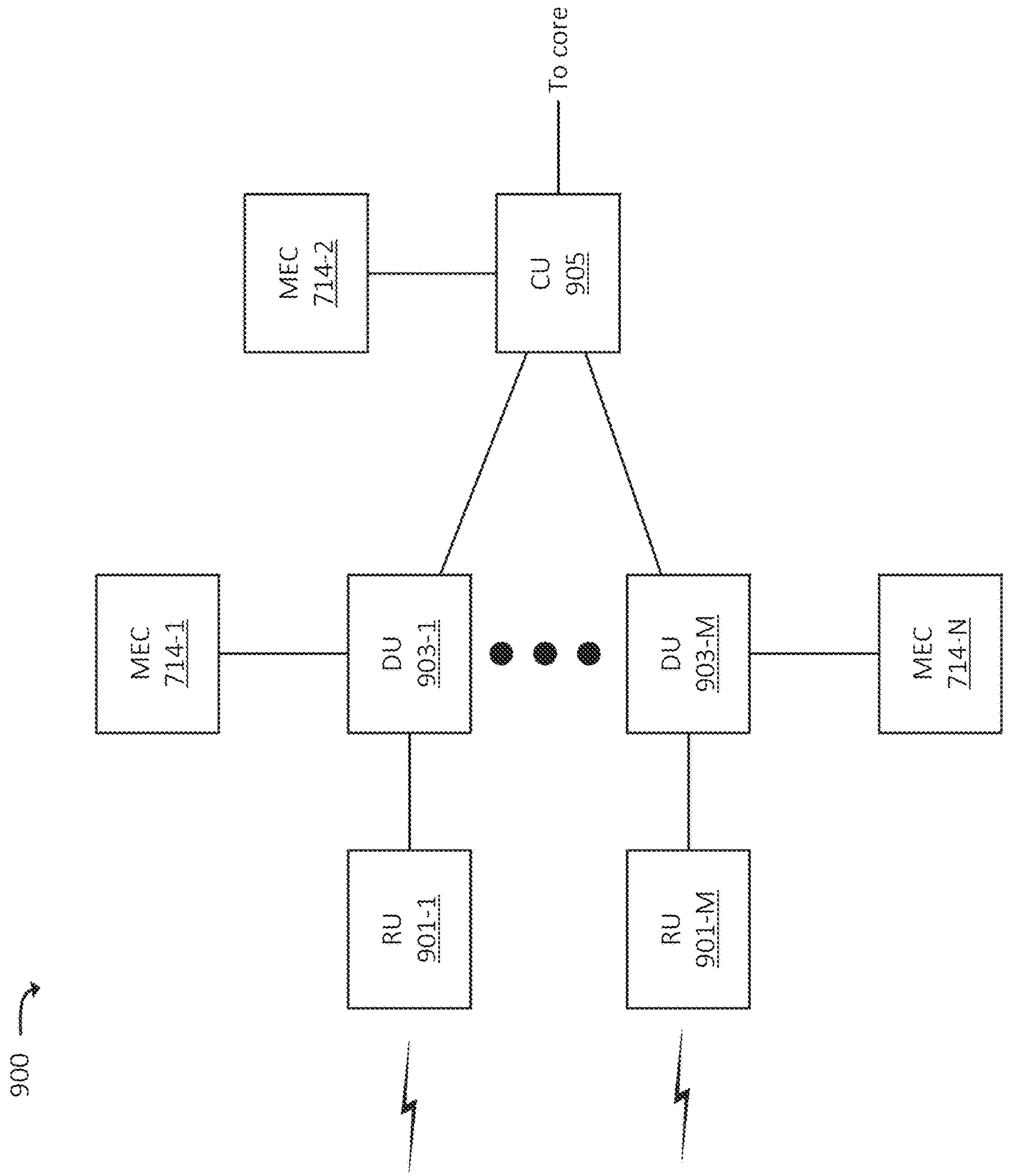
FIG. 9 illustrates an example arrangement of a radio access network ("RAN"), in accordance with some embodiments.

FIG. 9 illustrates an example RAN environment 900, which may be included in and/or implemented by one or more RANs (e.g., RAN 710 or some other RAN). In some embodiments, a particular RAN 710 may include one RAN environment 900. In some embodiments, a particular RAN 710 may include multiple RAN environments 900. In some embodiments, RAN environment 900 may correspond to a particular gNB 711 of RAN 710. In some embodiments, RAN environment 900 may correspond to multiple gNBs 711. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-M (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 715 and/or UPF 805) and/or some other device or system such as MEC 714. In the uplink direction (e.g., for traffic from UEs 101 to a core network), CU 905 may aggregate traffic from DUs 903, and forward the aggregated traffic to the core network. In some embodiments, CU 905 may receive traffic according to a given protocol (e.g., Radio Link Control ("RLC") traffic) from DUs 903, and may perform higher-layer processing (e.g., may aggregate/process RLC packets and generate Packet Data Convergence Protocol ("PDCP") packets based on the RLC packets) on the traffic received from DUs 903.

CU 905 may receive downlink traffic (e.g., traffic from the core network, traffic from a given MEC 714, etc.) for a particular UE 101, and may determine which DU(s) 903 should receive the downlink traffic. DU 903 may include one or more devices that transmit traffic between a core network (e.g., via CU 905) and UE 101 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 101.

RU 901 may include hardware circuitry (e.g., one or more RF transceivers, antennas, radios, and/or other suitable hardware) to communicate wirelessly (e.g., via an RF interface) with one or more UEs 101, one or more other DUs 903 (e.g., via RUs 901 associated with DUs 903), and/or any other suitable type of device. In the uplink direction, RU 901 may receive traffic from UE 101 and/or another DU 903 via the RF interface and may provide the traffic to DU 903. In the downlink direction, RU 901 may receive traffic from DU 903, and may provide the traffic to UE 101 and/or another DU 903.

One or more elements of RAN environment 900 may, in some embodiments, be communicatively coupled to one or more MECs 714. For example, DU 903-1 may be communicatively coupled to MEC 714-1, DU 903-M may be communicatively coupled to MEC 714-N, CU 905 may be communicatively coupled to MEC 714-2, and so on. MECs 714 may include hardware resources (e.g., configurable or provisionable hardware resources) that may be configured to provide services and/or otherwise process traffic to and/or from UE 101, via a respective RU 901.

For example, DU 903-1 may route some traffic, from UE 101, to MEC 714-1 instead of to a core network via CU 905. MEC 714-1 may process the traffic, perform one or more computations based on the received traffic, and may provide traffic to UE 101 via RU 901-1. As discussed above, MEC 714 may include, and/or may implement, some or all of the functionality described above with respect to UPF 805, AF 730, and/or one or more other devices, systems, VNFs, CNFs, etc. In this manner, ultra-low latency services may be provided to UE 101, as traffic does not need to traverse DU 903, CU 905, links between DU 903 and CU 905, and an intervening backhaul network between RAN environment 900 and the core network.

Figure 10:
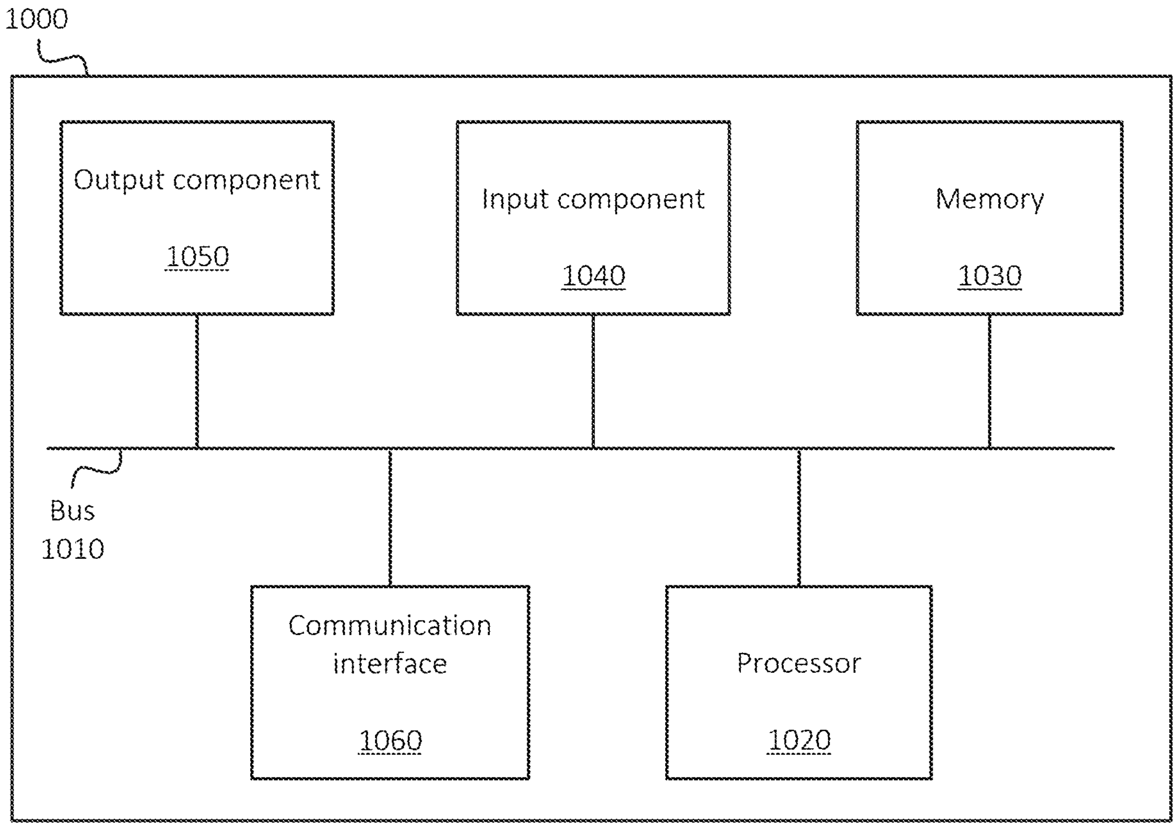
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, a set of provisioned hardware resources of a cloud computing system, or other suitable type of hardware that interprets and/or executes instructions (e.g., processor-executable instructions). In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or otherwise receives or detects input from a source external to input component 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems (e.g., via RAN 710, RAN 712, DN 750, etc.). For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1000 may include more than one communication interface 1060. For instance, device 1000 may include an optical interface, a wireless interface, an Ethernet interface, and/or one or more other interfaces.

Device 1000 may perform certain operations relating to one or more processes described above. Device 1000 may perform these operations in response to processor 1020 executing instructions, such as software instructions, processor-executable instructions, etc. stored in a computer-readable medium, such as memory 1030. A computer-readable medium may be defined as a non-transitory memory device. A memory device may include space within a single physical memory device or spread across multiple physical memory devices. The instructions may be read into memory 1030 from another computer-readable medium or from another device. The instructions stored in memory 1030 may be processor-executable instructions that cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

maintain a set of criteria associated with one or more back-off timer policies, wherein a particular back-off timer policy includes one or more thresholds associated with a first network;

perform one or more attempts to communicate with a second network;

determine that the one or more attempts to communicate with the second network are unsuccessful;

initiate a back-off timer based on determining that the one or more attempts to communicate with the second network are unsuccessful;

refrain from attempting to communicate with the second network after initiating the back-off timer and prior to expiration of the back-off timer;

determine, after initiating the back-off timer and prior to expiration of the back-off timer, that the one or more thresholds associated with the first network are satisfied;

modify a duration of the back-off timer based on determining that the one or more thresholds associated with the first network are satisfied; and attempt to communicate with the second network after the back-off timer with the modified duration has elapsed.

2. The device of claim 1, wherein the back-off timer is initiated with a first duration, wherein the back-off timer has a second duration that is shorter than the first duration after modifying the back-off timer.

3. The device of claim 1, wherein modifying the duration of the back-off timer includes reducing a remaining duration of the back-off timer to zero.

4. The device of claim 1, wherein the one or more attempts to communicate with the second network include outputting one or more connection requests to a base station of the second network while connected to the first network.

5. The device of claim 4, wherein the one or more connection requests include one or more Random Access Channel ("RACH") requests.

6. The device of claim 1, wherein the one or more thresholds include a threshold measure of signal strength or quality with the first network, wherein determining that the one or more thresholds are satisfied includes determining that a measure of signal strength or quality with the first network is below a particular threshold measure of signal strength or quality.

7. The device of claim 1, wherein the first network implements a first radio access technology ("RAT"), and wherein the second network implements a second RAT that is different from the first RAT.

8. A non-transitory computer-readable medium, storing a plurality of processor-executable instructions to:

maintain a set of criteria associated with one or more back-off timer policies, wherein a particular back-off timer policy includes one or more thresholds associated with a first network;

perform one or more attempts to communicate with a second network;

determine that the one or more attempts to communicate with the second network are unsuccessful;

initiate a back-off timer based on determining that the one or more attempts to communicate with the second network are unsuccessful;

refrain from attempting to communicate with the second network after initiating the back-off timer and prior to expiration of the back-off timer;

determine, after initiating the back-off timer and prior to expiration of the back-off timer, that the one or more thresholds associated with the first network are satisfied;

modify a duration of the back-off timer based on determining that the one or more thresholds associated with the first network are satisfied; and attempt to communicate with the second network after the back-off timer with the modified duration has elapsed.

9. The non-transitory computer-readable medium of claim 8, wherein the back-off timer is initiated with a first duration, wherein the back-off timer has a second duration that is shorter than the first duration after modifying the back-off timer.

10. The non-transitory computer-readable medium of claim 8, wherein modifying the duration of the back-off timer includes reducing a remaining duration of the back-off timer to zero.

11. The non-transitory computer-readable medium of claim 8, wherein the one or more attempts to communicate with the second network include outputting one or more connection requests to a base station of the second network while connected to the first network.

12. The non-transitory computer-readable medium of claim 11, wherein the one or more connection requests include one or more Random Access Channel ("RACH") requests.

13. The non-transitory computer-readable medium of claim 8, wherein the one or more thresholds include a threshold measure of signal strength or quality with the first network, wherein determining that the one or more thresholds are satisfied includes determining that a measure of signal strength or quality with the first network is below a particular threshold measure of signal strength or quality.

14. The non-transitory computer-readable medium of claim 8, wherein the first network implements a first radio access technology ("RAT"), and wherein the second network implements a second RAT that is different from the first RAT.

15. A method, comprising:

maintaining a set of criteria associated with one or more back-off timer policies, wherein a particular back-off timer policy includes one or more thresholds associated with a first network;

performing one or more attempts to communicate with a second network;

determining that the one or more attempts to communicate with the second network are unsuccessful;

initiating a back-off timer based on determining that the one or more attempts to communicate with the second network are unsuccessful;

refraining from attempting to communicate with the second network after initiating the back-off timer and prior to expiration of the back-off timer;

determining, after initiating the back-off timer and prior to expiration of the back-off timer, that the one or more thresholds associated with the first network are satisfied;

modifying a duration of the back-off timer based on determining that the one or more thresholds associated with the first network are satisfied; and attempting to communicate with the second network after the back-off timer with the modified duration has elapsed.

16. The method of claim 15, wherein the back-off timer is initiated with a first duration, wherein the back-off timer has a second duration that is shorter than the first duration after modifying the back-off timer.

17. The method of claim 15, wherein the one or more attempts to communicate with the second network include outputting one or more connection requests to a base station of the second network while connected to the first network.

18. The method of claim 15, wherein the one or more thresholds include a threshold measure of signal strength or quality with the first network, wherein determining that the one or more thresholds are satisfied includes determining that a measure of signal strength or quality with the first network is below a particular threshold measure of signal strength or quality.

19. The method of claim 15, wherein the first network implements a first radio access technology ("RAT"), and wherein the second network implements a second RAT that is different from the first RAT.

20. The method of claim 19, wherein the first network includes a WiFi network, and wherein the second network includes at least one of a Long-Term Evolution ("LTE") network or a Fifth Generation ("5G") network.

* * * * *